United States Patent Office 3,001,966
Patented Sept. 26, 1961

3,001,966
THERMALLY-STABILIZED POLYACETALDEHYDE ELASTOMERS, PROCESS FOR THEIR PREPARATION AND MIXTURES OF SAME WITH POLYCARBONAMIDES
Dennis Light Funck and Otto Franz Leopold Vogl, Wilmington, Del., assignors to E. I. du Pont de Nemours and Company, Wilmington, Del., a corporation of Delaware
No Drawing. Filed Aug. 18, 1958, Ser. No. 755,437
15 Claims. (Cl. 260—42)

This invention relates to a novel process for polymerizing acetaldehyde and for rendering the resultant elastomer thermally stable, and to the novel products obtained. More particularly, this invention relates to a process for polymerizing acetaldehyde in solution and for stabilizing the resultant elastomeric polymers of acetaldehyde, and to the novel thermally-stable elastomers obtained.

The polymerization of acetaldehyde to an elastomeric polymer by freezing purified acetaldehyde was observed independently by M. Letort, Compt. rend. 202, 767 (1936) and by M. W. Travers, Trans. Faraday Soc. 32, 246 (1936). The chemical structure of this polyacetaldehyde is that of an acetal polymer having molecular chains consisting of a succession of alternate carbon atoms and oxygen atoms

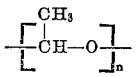

as first proposed by H. Staudinger in 1936 and confirmed by the infrared studies of G. B. B. M. Sutherland et al. in 1946, Nature 157, 267. Since the polyacetaldehyde obtained is an amorphous, non-crystalline, elastomer it is believed that this polyacetaldehyde is atactic; that is, the monomer units are believed to be joined with the methyl side groups in random configuration along the polymer chains. This elastomeric polyacetaldehyde has, hitherto, had no commercial utility because of its extreme thermal instability; it rapidly decomposes to the monomer even at room temperature. Furthermore, the polymerization process, involving freezing and melting the purified monomer (freezing point $-123°$ C.) gives low and variable yields. Traces of acidic and peroxidic impurities, present in variable amounts, have been reported to be the catalysts for this polymerization.

Therefore, one object of this invention is to provide thermally stable, high-molecular weight, amorphous polyacetaldehyde useful as a novel elastomer. Another object of this invention is to provide an improved process for the polymerization of acetaldehyde and for the stabilization of the amorphous polymer. Other objects and advantages of the subject invention will appear hereinafter.

It has now been found, as disclosed herein, that the objects and advantages of this invention can be achieved by providing an elastomer comprising amorphous polyacetaldehyde having a number average molecular weight of at least 20,000 and preferably between about $1 \times 10^5$ and $3 \times 10^6$ and having thermally stable terminating groups on the ends of the polymer chains. These terminating groups are selected from the class which consists of ether groups and carboxylic ester groups. It has been discovered that further improvement in thermal stability can be achieved by mixing with this end-capped polyacetaldehyde from 0.1 to 10% by weight of a non-volatile carboxamide, preferably a macromolecular superpolyamide, having a melting point below 225° C. Maximum thermal and oxidative stability is achieved, in accordance with this invention, by providing an elastomer consisting essentially of a mixture of amorphous polyacetaldehyde, having a number average molecular weight between about $1 \times 10^5$ and $3 \times 10^6$ and having either carboxylic ester groups or ether groups as terminating groups on the ends of the polymer chains, with from 0.1 to 10% by weight of a non-volatile carboxamide having a melting point below 225° C. and with from 0.05% to 1.0% by weight of a compatible antioxidant, preferably an aromatic diamine.

While the polyacetaldehyde employed in the preparation of the novel elastomers of this invention may be obtained by polymerization of acetaldehyde by freezing the purified monomer according to the process of the prior art, it has now been discovered that greatly improved yields and reproducibility can be achieved by the use of a novel process for polymerizing acetaldehyde in solution which comprises dissolving acetaldehyde in a hydrocarbon solvent at a temperature below $-50°$ C., adding boron trifluoride-etherate as catalyst, stirring while maintaining the temperature at below $-50°$ C. while the polymerization proceeds, and then deactivating the catalyst and stopping the reaction while maintaining the temperature below $-50°$ C., and allowing the reaction mixture to warm to room temperature. A pyridine solution of polyacetaldehyde is then treated with a carboxylic acid anhydride and shaken, preferably in the absence of oxygen, in order to esterify the hydroxyl groups which comprise the chain ends of the polymer molecules. The esterified, end-capped polyacetaldehyde can then be recovered from the reaction mixture by pouring the solution into ice and water. Alternatively the molecules can be ether end-capped by reaction with methylal in the presence of a small amount of sulfuric acid.

As indicated above, an elastomeric polyacetaldehyde composition of maximum thermal and oxidative stability is obtained by mixing small amounts of a carboxamide melting below 225° C. and of an aromatic diamine with the end-capped polyacetaldehyde. A convenient method of preparing this composition is to dissolve the amorphous, end-capped polyacetaldehyde in diethyl ether and to add a dilute solution of the polyamide in methanol and a dilute solution of the aromatic diamine in acetone. After thorough mixing, the solvents are then removed by evaporation and the thermally-stable polyacetaldehyde composition recovered.

The non-volatile carboxamides having melting points below 225° C. employed in compositions of the subject invention include monomeric compounds such as adipamide and the diamides of longer-chain dicarboxylic acids; amides of monocarboxylic acids are less satisfactory. The preferred carboxamines are the macromolecular superpolyamides in which carboxamide linkages form an integral part of the polymer chains and which, upon hydrolysis, yield monomeric compounds selected from at least one member of the group consisting of (1) mixtures of dicarboxylic acids and diamines and (2) aminomonocarboxylic acids; the commonly accepted generic term for such superpolyamides is nylons. For reasons of compatibility, only those nylons melting below about 225° C. have been found to be effective in the preparation of thermally-stable elastomers comprising polyacetaldehyde. A particularly effective nylon for use in the novel elastomers of this invention is the copolymer which, upon hydrolysis, yields a mixture of omega-aminocaproic acid, sebacic acid, adipic acid, and hexamethylene diamine in a molecular ratio of 3.85 to 1.0 to 1.6 to 2.6; for convenience, this nylon is hereinafter referred to as 66/610/6 nylon.

The preferred aromatic diamine antioxidants employed in compositions of the subject invention are wholly aromatic secondary diamines which can be represented by the formula $R_1$—NH—$C_6H_4$—NH—$R_2$ where $R_1$ and $R_2$ are aromatic hydrocarbon radicals, and the —$C_6H_4$— is a p-phenylene radical. Examples of the wholly aromatic secondary diamines include sym-di (beta-naphthyl)-p-phenylenediamine and N,N' - diphenyl - p - phenylenediamine.

The stabilization of polyacetaldehyde to convert it into a useful elastomer is remarkable in view of the extreme instability of the polymer known to the prior art. At room temperature, the prior art material rapidly decomposes by a depolymerization process to the monomer. Even at −20° C. in the presence of an antioxidant, storage for a limited time results in serious loss in molecular weight. A major improvement in room temperature stability is achieved by the end-capping process comprising esterification of terminal hydroxyl groups with a carboxylic acid anhydride dissolved in a tertiary amine. In a preferred embodiment, the process involves acetylation of the terminal hydroxyl groups of the polymer chains by use of a pyridine solution of acetic anhydride. It has been found that the conditions for this acetylation are critical. The polymer dissolved in pyridine or other tertiary amine is shaken at room temperature (15° to 30° C.) with an excess of acetic anhydride for a period of about two hours in the absence of oxygen under an atmosphere of nitrogen or other inert gas. Very much shorter or longer times of reaction yield polymers of inferior stability. It is preferable that the polyacetaldehyde be dissolved in the pyridine before contact with the acetic anhydride. No acid-catalyzed process has been successfully employed to acetic endcap the polyacetaldehyde elastomer. The product is recovered by mixing the viscous pyridine capping reaction mixture with an excess of ice and water and kneading the coagulated elastomer with ice-water to completely destroy the acetic anhydride-pyridine complex, N-acetyl pyridium acetate.

For higher temperature stability, still further improvement is desirable. The non-volatile carboxamides melting below 225° C. have been found to be particularly effective for this purpose and, so far as is known, are unique in their ability to impart thermal stability to polyacetaldehyde. The explanation of this effect has not been conclusively demonstrated, but it is believed that these carboxamides serve as acid acceptors for any acidic materials present or liberated within the polyacetaldehyde, thus preventing chain rupture by proton attack. In order to be effective these carboxamide-containing compounds must be thoroughly and uniformly dispersed throughout the polyacetaldehyde; i.e. they must be compatible with the polyacetaldehyde; i.e. they must be at least partly dissolved in the polyacetaldehyde elastomer; furthermore they must be non-volatile so as to remain in solution in the elastomer. Non-volatile carboxamides melting below about 225° C. have been found to meet these requirements.

Oxidative attack at elevated temperatures also is harmful in producing degradation of polyacetaldehyde elastomer. A variety of compounds effective in other polymeric materials as antioxidants were tried in polyacetaldehyde elastomer. Of these, the most effective found for imparting oxidative stability to polyacetaldehyde elastomers are the aromatic diamines discussed hereinabove. Actually certain common antioxidants of the phenolic type, such as dixylenol butane, were found to have adverse effect upon thermal stability of polyacetaldehyde, and therefore are not compatible antioxidants for these elastomers.

In order to provide a standard for the thermal stability of the polyacetaldehyde elastomers, rate constants for the thermal degradation reaction were determined at two temperatures, 111° C. and 138° C. The procedure followed in making the determinations of rate constant was as follows:

A sample of polyacetaldehyde elastomer was placed in a test-tube and weighed. The air in the tube was displaced by nitrogen by passing nitrogen into the tube for 3 minutes. Then the tube was placed in a constant temperature bath consisting of boiling toluene (B.P. 111°) or boiling paraxylene (B.P. 138°) for a time sufficient to cause some depolymerization and volatilization of monomeric acetaldehyde. Then the test-tube was removed from the bath and cooled to room temperature under nitrogen for three minutes, placed next to the balance for two minutes, and then weighed. By repeating the experiment for different intervals of time and calculating the weight percent remaining with time and plotting the log percent remaining against time, one derives a curve whose slope defines the rate constant for thermal degradation. This may be expressed mathematically by the equation $$k = 2.3 (\log \text{percent rem. } t_1 - \log \text{percent rem. } t_2)/(t_2+t_1) \times 100$$

In the case of polyacetaldehyde the $k$ is first order, at least after the first five or ten minutes of heating where the curve may be either steeper or flatter. When the polyacetaldehyde is of high molecular weight, well-purified, and stabilized in accordance with this invention, the $k_{111°}$ obtained is only about $1/1000$ as great as for unstabilized polyacetaldehyde which depolymerizes completely within twenty minutes at 111° C. With the stabilized elastomer, the plot of log percent remaining versus time is a straight line even when continued for seven hours.

The end-capped polyacetaldehydes of this invention have $k_{111°}$ values of less than about 3.5% per minute and generally between about 0.001 and about 3.0% per minute at 111° C. When stabilized with carboxamides and aromatic diamines as disclosed hereinabove, these elastomeric polyacetaldehydes have $k_{111°}$ values of less than about 0.4% per minute and generally in the range of 0.0001 to 0.35% per minute and $k_{138°}$ values in the range of 0.01 to 0.8% per minute.

The relationship between molecular weight as determined from osmotic measurements ($M_n$) and intrinsic viscosity of unstabilized polyacetaldehyde has been determined by H. Mark, J. Polym. Science 4, 91 (1949). Therefore the number average molecular weight values reported in this specification were determined from Mark's relationship using solution viscosity measurements made in butanone at 25–30° C. employing Ostwald viscometers. It has been assumed that the relationship determined by Mark for the uncapped polyacetaldehyde applies with reasonable accuracy to the stabilized, end-capped polyacetaldehydes of the subject invention.

The infra-red spectra of this elastomeric polyacetaldehyde, stabilized by acetylation of the end groups, have been obtained on 2-mil film and on solutions in carbon tetrachloride. The film spectrum shows very strong absorption between 8.3 and 9.7 microns and between 10.2 and 11 microns, as well as a considerable amount of overtone absorption between 2 and 6.5 microns. There is at most a trace of carbonyl band at 5.75 microns. The solution spectrum shows a sharp double band at 3.37 and 3.43 microns as well as C—H frequencies at 6.91, 7.24, and 7.48 microns. There is a strong band of four absorption peaks present at 8.4, 8.8, 9.2, and 9.6 microns and other bands at 10.65, at 10.35, and at about 11.0 and 11.8 microns. These results are in good agreement with the structure of polyacetaldehyde as a polyacetal. Absorption due to OH is completely missing, and no end groups are visible, which is consistent with the high molecular weight of the polymer. The strong absorption between 8 and 11 microns is characteristic for C—O—C frequencies. A very minute absorption at 6.08 microns is due to the CO—NH frequency from the nylon added as a stabilizer.

X-ray analysis of this polyacetaldehyde elastomer showed a typical amorphous spacing of approximately 3.9 A. and 7.2 A., as has been found by H. M. Powell and reported by H. A. Rigby et al., J. Chem. Soc. 1948, 237, for the unstabilized polyacetaldehyde.

For the determination of mechanical properties, sheets were compression molded, using films of polytetrafluoroethylene or of polyvinyl alcohol as shim covers to prevent sticking, at 105° C. for 1 minute followed by a 5-minute period at room temperature under pressure. Bubble-free sheets of this novel stabilized elastomer were thus prepared in thicknesses of 10, 25, and 60 mils. In contrast, unstabilized polyacetaldehyde of the prior art under these conditions showed extensive degradation and bubbling. Tensile testing of the sheets of this novel elastomer showed that it possessed typical long-range, rubber-like elasticity with good recovery even from high elongations. At 23° C., the tensile strength of the stabilized polyacetaldehyde was 25–27 p.s.i. at elongations as high as 580%; at −10° C., the tensile strength was 171 p.s.i. at 15% elongation; and at −40° C., the tensile strength was 990 p.s.i. at 11% elongation. Measurement of internal friction and torsion modulus showed a main amorphous transition at −18° C. (0.6 cycle/second), and there was a small secondary transition at about −100° C. Such behavior is typical for a completely amorphous polymer.

As has been pointed out above, the polymerization of acetaldehyde by freezing as taught by the prior art is an uneconomical and uncertain process. The result in a particular case appears to be affected by such variables as the area and condition of the surface of the reaction apparatus, the rates of freezing and melting, and the degree of purity of the acetaldehyde and nature of the impurities present. While conversions of monomer to polymer as high as 40% have been obtained at times and polymer having an inherent viscosity as high as 5 has been achieved by this process at other times, it has not been possible to design an experimental procedure following the freezing process which would give predictable results or would give both high yield and high molecular weight at the same time. However, when high molecular weight polyacetaldehyde is obtained by the freezing method, the product can be end-capped and stabilized to yield the novel elastomer of this invention. After stabilization, the infrared spectrum of the polymer made in this way is almost superimposable upon the spectrum of polymer made by the novel solution-polymerization process disclosed in this specification.

Whatever method of polymerization is employed, it is necessary to have acetaldehyde of high purity as a starting material. Fractional distillation under nitrogen has been found to be the most effective, practical method for the purification. Commercial acetaldehyde has been found to vary in acid content ranging from 400 to 3600 p.p.m. and higher. Since peroxyacetic acid obtained by air oxidation of acetaldehyde has been reported by Letort to be a particularly effective catalyst, it is obviously important to refine commercial acetaldehyde. It has been found that two distillations in nitrogen atmosphere can yield acetaldehyde having from 18 to 30 p.p.m. acid content (calculated as acetic acid) and that monomer of this purity is suitable for polymerization. The acid content of acetaldehyde can be determined by titration with 0.02 N sodium hydroxide solution in ice water to the cresol red end-point. Accuracy of about 4 p.p.m. is achieved, using 10–20 ml. samples of acetaldehyde.

The procedure followed when polymerizing acetaldehyde by freezing was to distill purified acetaldehyde into the polymerization vessel maintained above the melting point of acetaldehyde by a bath of methyl cyclohexane containing solid carbon dioxide ("Dry Ice"). After completing the distillation, a slow stream of anhydrous nitrogen was passed over the acetaldehyde which was cooled below the freezing point and allowed to crystallize slowly over a period of 1–3 hours. Since it is not certain whether the freezing or the melting step is critical in this polymerization process, the warm-up period was also extended over a period of several hours. A gelatinous, colorless solution of the polymer in monomer was obtained.

The elastomeric polyacetaldehyde can be recovered from this solution by dilution with at least twice its volume of cold water. A major portion of the unconverted acetaldehyde can be removed from the polymer by kneading in running cold water. The polymer can be dried and freed of residual monomer by dissolving the polymer in anhydrous, peroxide-free ethyl ether under nitrogen and evaporating the ether under vacuum. The product is then suitable for stabilization by end-capping in accordance with the process of this invention.

The following examples are provided to illustrate the process and products of the subject invention without any intention to limit the invention to the particular embodiments of the examples.

EXAMPLE 1

A polymerization vessel consisting essentially of a 500 cc. flask equipped with a stirrer, a thermometer and an inlet and outlet for gases was flushed with nitrogen gas and cooled externally in a bath of liquid nitrogen. Ethylene gas was passed into the vessel until 250 m. of liquified ethylene was condensed as solvent for the polymerization reaction. Then 40 ml. of liquid acetaldehyde, previously purified by distillation, was injected by means of a hypodermic syringe, and the temperature adjusted to between −120° and −130° C. Five drops of catalyst solution comprising the complex compound, boron trifluoride-etherate, in a mole ratio of 1:1, was injected while stirring the acetaldehyde solution. After an induction period of from 10 to 30 minutes, polymerization commenced; stirring was continued throughout the polymerization, until the reaction vessel was filled with rubbery polyacetaldehyde which stopped the stirrer. The polymerization mixture was maintained at the polymerization temperature for an additional hour, and then the catalyst was destroyed and polymerization halted by the slow addition of 20 ml. of triethylamine dissolved in 150 ml. of pyridine. The addition of the amine solution was sufficiently slow to prevent the temperature in the reactor from rising above −110° C. until the addition was complete, whereupon the temperature was allowed to rise to room temperature. The polymeric product remained in solution in the pyridine.

Stabilization of the polyacetaldehyde was accomplished by adding 60 ml. of pyridine and 40 ml. of acetic anhydride to the above solution and shaking in the absence of oxygen under nitrogen for 2 hours at room temperature. The end-capped polymer was recovered by pouring the pyridine-acetic anhydride solution into a mixture of ice and water, thoroughly washing the polymer in water, and drying under vacuum. A yield of polyacetaldehyde in excess of 80% was recovered. If desired, any low molecular weight polyacetaldehyde can be removed by fractional precipitation of the high polymer from acetone-water mixtures. By this novel polymerization and stabilization process, polyacetaldehyde having a number average molecular weight greater than 1,000,000 was obtained. This product was further stabilized by dissolving the polymer in ethyl ether and adding a dilute solution of 66/610/6 nylon in methanol and dilute solution of sym-di(beta-naphthyl)-p-phenylenediamine in acetone, mixing, and evaporating the solvents to give an acetate-capped polyacetaldehyde containing 1% by weight of the nylon and 0.2% by weight of the aromatic diamine. This product has a thermal instability constant at 138° C., $k_{138}$, of 0.35% per minute, determined as disclosed hereinabove.

EXAMPLE 2

Ten grams of an amorphous polyacetaldehyde, prepared by the freezing technique and having a number average molecular weight of $1.35 \times 10^6$ and a $k_{111°}$ of 9.6% per minute, determined as disclosed hereinabove, was dissolved in 200 ml. of dry pyridine at room temperature with mechanical shaking in the absence of oxygen. When the polymer was completely dissolved, a mixture of 50 ml. of acetic anhydride and 50 ml. of pyridine was added at room temperature and the solution shaken for 2 hours at room temperature. An excess of crushed ice was added to coagulate the product which was then thoroughly washed by kneading with cold water. It was dried by dissolving in ether, drying the ether solution, and evaporating the ether. The acetate-capped product now exhibited a thermal instability constant, $k_{111°}$, of 3.23% per minute. Its number average molecular weight was $1.0 \times 10^6$. In another experiment reproducing the above process but starting with a polyacetaldehyde having a $k_{111°}$ of 9.8% per minute, the acetate-capped product had a $k_{111°}$ of 1.10% per minute.

EXAMPLE 3

The effects on the thermal stability of uncapped polyacetaldehyde, prepared by the freezing polymerization procedure, of the addition of carboxamides and aromatic amines were tested in a series of experiments. In each case, the amorphous polyacetaldehyde was dissolved in ethyl ether and a dilute solution of the carboxamide in methanol or of the aromatic amine in acetone was added with stirring, and the polyacetaldehyde containing the additive was recovered by evaporation of the ether. Thermal instability constants for the resultant products were then determined as previously described.

This series of experiments is listed in Table I from which the stabilization effect of each additive can be seen.

Table I

| Sample No. | Additive | Amount, percent | No Additive, $k_{111°}$ | With Additive $k'_{111°}$ | With Additive $k'_{139°}$ |
|---|---|---|---|---|---|
| 1 | Nylon (6/iso-10)[a] | 2 | 12.3 | 5.9 | |
| 2 | Nylon (66/610/6)[b] | 2 | 12.3 | 0.62 | |
| 3 | DNPD[c] | 0.2 | 9.6 | 0.79 | |
| 4 | Nylon (66/610/6) / DNPD | 2.0 / 0.2 | 9.6 | 0.13 | 0.80 |
| 5 | DNPD / Nylon (66/610/6) | 0.2 / 2.0 | 9.6 | 0.075 | 0.23 |

[a] Nylon which upon hydrolysis yields hexamethylenediamine and iso-sebacic acid.
[b] Nylon which upon hydrolysis yields omega-aminocaproic acid, hexamethylenediamine, sebacic acid, and adipic acid.
[c] Sym-di(beta-naphthyl)-p-phenylenediamine.

In Table I, the $k$ values are the thermal instability constants for the uncapped polyacetaldehyde containing no additive. The $k'$ values are for the polyacetaldehyde with the indicated additive. These $k$ values were determined by the procedure described hereinabove and represent the rate of weight loss of the polymers at the indicated temperatures in terms of percent per minute. Comparison of the $k_{111°}$ values with the corresponding $k'_{111°}$ values shows that each of these additives produced a significant improvement in thermal stability, and that a particularly striking improvement was achieved by the combination of nylon with an aromatic diamine.

EXAMPLE 4

The effects on the thermal stability of acetate capped polyacetaldehyde, prepared according to either of the processes of Examples 1 or 2, of the addition of carboxamides, aromatic diamines, and of phenolic compounds were tested in a second series of experiments. The polyacetaldehyde compositions were compounded by the process of Example 3. This series of experiments is listed in Table II which shows the various k and k' values found for the various compositions.

Table II

| Sample No. | Additive | Amount, percent | No Additive, $k_{111°}$ | With Additive $k'_{111°}$ | With Additive $k'_{139°}$ |
|---|---|---|---|---|---|
| 6 | Adipamide | 3 | 0.89 | 0.15 | |
| 7 | Nylon (66/610/6) | 2 | 0.89 | 0.028 | |
| 8 | Dixylenolbutane | 0.2 | 0.89 | 1.83 | |
| 9 | Nylon (66/610/6) / DNPD | 0.1 / 0.2 | 3.23 | 0.39 | |
| 10 | Nylon (66/610/6) / DNPD | 0.5 / 0.2 | 3.23 | 0.030 | 0.26 |
| 11 | Nylon (66/610/6) / DNPD | 1.0 / 0.2 | 3.23 | 0.031 | 0.27 |
| 12 | Nylon (66/610/6) / DNPD | 2.0 / 0.2 | 3.23 | 0.019 | 0.17 |
| 13 | Nylon (66/610/6) / DNPD | 5.0 / 0.2 | 3.23 | | 0.13 |

From an inspection of the data of Table II, it is apparent that a remarkable degree of thermal stability can be imparted to polyacetaldehyde elastomer by a process which combines acetate end-capping with the addition of a nylon and of an aromatic diamine (samples 10–13). Comparison of samples 7 and 10 shows that a much smaller proportion of nylon additive is required in the presence of an aroamtic diamine, to achieve comparable stability. Comparison of samples 6 and 7 indicates the greater effectiveness of a superpolyamide as compared with a simple monomeric diamide. Sample 8 provides an illustration of the adverse effect of phenolic antioxidants on the thermal stability of amorphous polyacetaldehyde.

The synergistic effect on improvement of thermal stability which can be achieved by combining acetate end-capping with the addition of carboxamide and aromatic diamine additives can be seen by comparison of the data in Table I of Example 3 with that in Table II of Example 4. Thus a comparison of the $k'_{111°}$ of sample 2 or sample 4 with that of sample 7 shows a marked improvement for the end-capped sample. Similarly, a comparison of sample 5 with sample 12 shows that much greater thermal stability (lower k value) is achieved by the addition of 2% nylon plus 0.2% sym-di(beta-naphthyl)-p-phenylenediamine to end-capped polyacetaldehyde.

The novel, stabilized elastomers of this invention are useful as inexpensive substitutes for gum rubber in such applications as adhesives, bonding agents, and rubber cements. When properly compounded and vulcanized they provide novel and inexpensive substitutes for natural rubber in the manufacture of a wide variety of articles requiring elasticity and resilience.

We claim:

1. An elastomer comprising thermally-stabilized, end-capped polyacetaldehyde having thermally-stable, terminating groups on the ends of the polymer chains, said terminating groups being selected from the class consisting of ether groups and carboxylic ester groups, and having a number average molecular weight of at least $2 \times 10^4$, having molecular chains consisting of a succession of alternate carbon atoms and oxygen atoms with methyl side groups attached to the chain carbon atoms in random configuration along the polymer chains, said elastomer exhibiting a thermal degradation constant, $k_{111°}$, of less than about 3.5% per minute at 111° C.

2. An elastomer comprising thermally-stabilized, end-capped polyacetaldehyde having a number average molecular weight of at least $2 \times 10^4$, having molecular chains consisting of a succession of alternate carbon atoms and oxygen atoms with methyl side groups attached to the chain carbon atoms in random configuration along the polymer chains, and having carboxylic ester groups as terminating groups on the ends of the polymer chains, said elastomer exhibiting a thermal degradation constant, $k_{111°}$, of less than about 3.5% per minute at 111° C.

3. A composition of claim 2 having a number average molecular weight between $1 \times 10^5$ and $3 \times 10^6$.

4. A composition of claim 2 wherein the carboxylic ester groups are acetate groups.

5. An elastomer consisting essentially of a mixture of amorphous polyacetaldehyde having a number average molecular weight between about $1 \times 10^5$ and $3 \times 10^6$, having molecular chains consisting of a succession of alternate carbon atoms and oxygen atoms with methyl side groups attached to the chain carbon atoms in random configuration along the polymer chains, and having carboxylic ester groups as terminating groups on the ends of the polymer chains, with from 0.1 to 10% by weight of a synthetic linear polymeric carbonamide which contains recurring carbonamide groups as an integral part of the main polymer chain separated by at least two carbon atoms, said polymeric carbonamide having a melting point below 225° C. and being selected from the group consisting of monocarboxylic acid amides, dicarboxylic acid diamides, and fiber-forming synthetic linear polymeric carbonamides which contain recurring carbonamide groups as an integral part of the main polymer chain separated by at least two carbon atoms, said elastomer having a thermal degradation constant, $k_{111°}$, of less than 0.35% per minute at 111° C.

6. A composition of claim 5 wherein the carboxylic ester terminating groups are acetate groups.

7. An elastomer consisting essentially of a mixture of amorphous polyacetaldehyde having a number average molecular weight between about $2 \times 10^4$ and $3 \times 10^6$, having molecular chains consisting of a succession of alternate carbon atoms and oxygen atoms with methyl side groups attached to the chain carbon atoms in random configuration along the polymer chains, and having acetate ester terminating groups on the ends of the polymer chains, with from 0.1 to 10% by weight of a synthetic linear polymeric carbonamide which, upon hydrolysis, yields a mixture of omega-aminocaproic acid, sebacic acid, adipic acid, and hexamethylene diamine, said elastomer having a thermal degradation constant, $k_{111°}$, of less than about 0.35% per minute at 111° C.

8. An elastomer consisting essentially of a mixture of amorphous polyacetaldehyde having a number average molecular weight between about $1 \times 10^5$ and $3 \times 10^6$, having molecular chains consisting of a succession of alternate carbon atoms and oxygen atoms with methyl side groups attached to the chain carbon atoms in random configuration along the polymer chains, and having carboxylic ester groups as terminating groups on the ends of the polymer chains, with from 0.1 to 10% by weight of a synthetic linear polymeric carbonamide which contains recurring carbonamide groups as an integral part of the main polymer chain separated by at least two carbon atoms, said polymeric carbonamide having a melting point below 225° C. and being selected from the group consisting of monocarboxylic acid amides, dicarboxylic acid diamides, and fiber-forming synthetic linear polymeric carbonamides which contain carbonamide groups as an integral part of the main polymer chain separated by at least two carbon atoms and with from 0.05 to 1% by weight of a wholly aromatic secondary diamine having a structure represented by the formula $R_1$—NH—$C_6H_4$—NH—$R_2$, where $R_1$ and $R_2$ are aromatic hydrocarbon radicals selected from the group consisting of phenyl and naphthyl, said elastomer having a thermal degradation constant, $k_{111°}$, of less than about 0.05% per minute at 111° C.

9. A composition of claim 8 wherein the carboxylic ester terminating groups are acetate groups.

10. An elastomer consisting essentially of a mixture of amorphous polyacetaldehyde having a number average molecular weight between $1 \times 10^5$ and $3 \times 10^6$, having molecular chains consisting of a succession of alternate carbon atoms and oxygen atoms with methyl side groups attached to the chain carbon atoms in random configuration along the polymer chains, and having acetate ester terminating groups on the ends of the polymer chains, with from 0.5 to 5% by weight of a synthetic linear polymeric carbonamide which, upon hydrolysis, yields a mixture of omega-aminocaproic acid, sebacic acid, adipic acid, and hexamethylene diamine, and with from 0.1 to 0.5% by weight of sym-di(beta-naphthyl)-p-phenylenediamine, said elastomer having a thermal degradation constant $k_{111°}$, of less than about 0.03% per minute at 111° C.

11. A process for stabilizing amorphous polyacetaldehyde which comprises reacting a solution of the polyacetaldehyde in a tertiary amine with a monocarboxylic acid anhydride at a temperature between about 15° C. and 30° C. for a period of up to two hours, under an inert atmosphere, whereby the terminal hydroxyl groups of the polymeric molecules are esterified, and recovering the stabilized polyacetaldehyde by mixing the tertiary amine solution with an excess of ice and water.

12. The process of claim 11 wherein the tertiary amine is pyridine and wherein the monocarboxylic acid anhydride is acetic anhydride.

13. A process for polymerizing acetaldehyde in solution which comprises dissolving acetaldehyde in a hydrocarbon solvent at below —50° C., adding a catalyst consisting of boron trifluoride-etherate, stirring while maintaining the polymerization temperature below —50° C. during the polymerization of the acetaldehyde, and then deactivating the catalyst by addition of a trialkyl amine while maintaining the temperature at essentially the polymerization temperature, and recovering an elastomeric, amorphous polyacetaldehyde having a number average molecular weight between about $1 \times 10^5$ and about $3 \times 10^6$ from the reaction mixture.

14. A process for polymerizing acetaldehyde in solution which comprises dissolving acetaldehyde in a hydrocarbon solvent at —120° to —130° C., adding a catalyst consisting of boron trifluoride-etherate, stirring while maintaining the polymerization temperature at —120° to —130° C. until at least 80% of the acetaldehyde has polymerized, then deactivating the catalyst and stopping the reaction by addition of a trialkyl amine dissolved in pyridine while maintaining the temperature below —110° C., allowing the reaction mixture to warm to room temperature, and recovering an elastomeric, amorphous polyacetaldehyde having a number average molecular weight between about $1 \times 10^5$ and about $3 \times 10^6$ from the reaction mixture, by mixing with water.

15. A process of claim 14 wherein the hydrocarbon solvent is liquid ethylene and wherein the trialkyl amine is triethyl amine.

References Cited in the file of this patent

FOREIGN PATENTS

| | | |
|---|---|---|
| 696,105 | Great Britain | Aug. 26, 1953 |
| 744,336 | Great Britain | Feb. 1, 1956 |
| 770,717 | Great Britain | Mar. 20, 1957 |

UNITED STATES PATENT OFFICE
CERTIFICATE OF CORRECTION

Patent No. 3,001,966 September 26, 1961

Dennis Light Funck et al.

It is hereby certified that error appears in the above numbered patent requiring correction and that the said Letters Patent should read as corrected below.

Column 3, line 28, for "acetic" read -- acetate --; column 4, line 14, for the right-hand portion of the equation reading "$(t_2+t_1)$" read -- $(t_2-t_1)$ --; line 72, for "has" read -- had --; column 6, line 21, for "250 m." read -- 250 ml. --; column 9, lines 14 to 19, and lines 51 to 56, strike out the clauses beginning with "and being selected" and ending with "two carbon atoms", each occurrence; column 10, line 23, for "polymeric" read -- polymer --.

Signed and sealed this 27th day of March 1962.

(SEAL)
Attest:

ERNEST W. SWIDER

Attesting Officer

DAVID L. LADD

Commissioner of Patents